Figure 1:
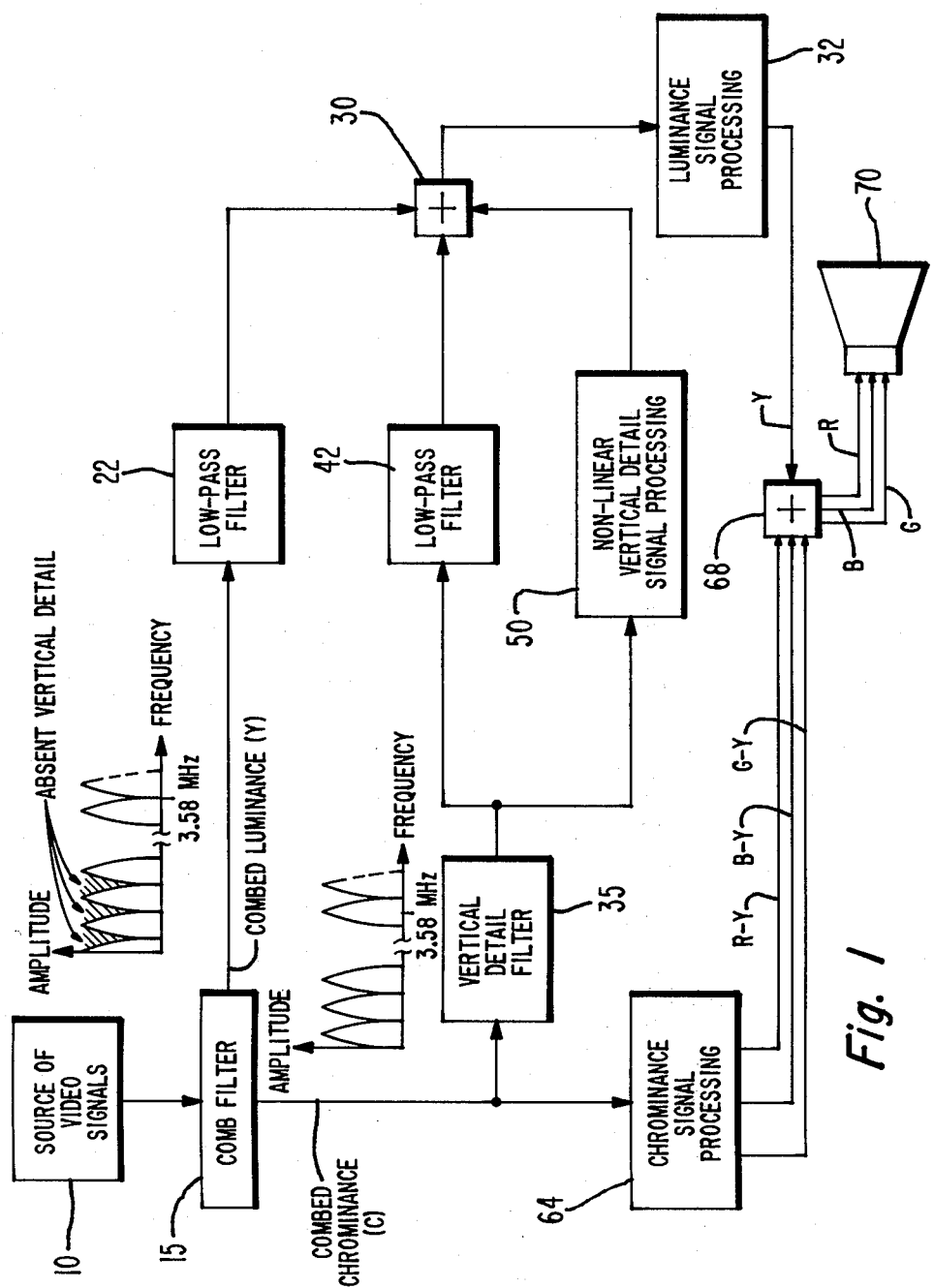

United States Patent [19]

Thornberry

[11] 4,403,246

[45] Sep. 6, 1983

[54] VERTICAL DETAIL ENHANCEMENT ON/OFF SWITCH

[75] Inventor: Gerald E. Thornberry, El Paso, Tex.

[73] Assignee: RCA Corporation, New York, N.Y.

[21] Appl. No.: 321,327

[22] Filed: Nov. 13, 1981

[51] Int. Cl.³ ............................................. H04N 9/535
[52] U.S. Cl. ..................................... 358/37; 358/166; 358/181; 307/253
[58] Field of Search ................... 358/37, 28, 21 R, 93, 358/160, 166, 181; 307/253, 248, 570, 572

[56] References Cited

U.S. PATENT DOCUMENTS

| 3,546,372 | 12/1970 | Dischert | 358/37 |
| 3,659,120 | 4/1972 | Saeki | 307/253 |
| 4,349,750 | 9/1982 | Geurts | 358/181 |

*Primary Examiner*—Richard Murray

*Attorney, Agent, or Firm*—Eugene M. Whitacre; Joseph S. Tripoli; Ronald H. Kurdyla

[57] ABSTRACT

In a television receiver having provision for a vertical detail enhancement signal, a circuit is provided for turning off the vertical detail enhancement without causing D.C. transients. A transistor circuit is provided having a feedback path between the collector and base electrodes which includes a capacitor and a diode. A switch actuated variable impedance is connected between a source of supply potential and the junction of the capacitor and diode. The capacitor is pre-charged when the switch is open such that when the switch is closed, to turn off the vertical detail enhancement signal, the junction point does not substantially change in D.C. level while the gain of the transistor amplifier is reduced to substantially reduce the amplitude of the enhancement signal.

9 Claims, 2 Drawing Figures

VERTICAL DETAIL ENHANCEMENT ON/OFF SWITCH

The present invention relates generally to a circuit for providing a "bounceless" switch, and, more particularly to a circuit useful in switching off the vertical enhancement signal in a color TV receiver without causing objectionable artifacts in the output display due to switching transients.

In a color television system such as the NTSC standard system developed by the United States, the luminance and chrominance components of a color television signal are disposed within the video frequency spectrum in frequency interleaved relations, with the luminance components at integral multiples of the horizontal line scanning frequency and the chrominance components at odd multiples of one-half the line scanning frequency. Various comb filter arrangements for separating the frequency interleaved luminance and chrominance components of the video signal are known, for example, from U.S. Pat. No. 4,143,397 (D. D. Holmes) and U.S. Pat. No. 4,096,516 (D. H. Pritchard).

A combed luminance signal which appears at the luminance output of the comb filter has been subjected to a "combing" effect over its entire band. The combing action over the high frequency band portion which is shared with chrominance signal components has the desired effect of delecting chrominance signal components. Extension of this combing action into the low frequency band portion which is not shared with the chrominance signal components, however, is not needed to effect the desired removal of chrominance signal components, and serves only to unnecessarily delete luminance signal components. Components in the lower end of the unshared band which are subject to such deletion are representative of "vertical detail" luminance information. Preservation of such vertical detail is desirable to avoid loss of vertical resolution in the luminance content of a displayed image.

One arrangement for preserving the vertical detail information employs a low pass filter coupled to the output of the comb filter at which the "combed" chrominance component appears. The upper cut-off frequency of this filter lies below the band occupied by the chrominance signal component (with an illustrative choice being just below 2 MHz). The filter selectively couples signals below the chrominance band from the chrominance output of the comb filter to a combining network where the selectively coupled signals are summed with combed luminance output signals from the comb filter. The combined signal includes a "combed" high frequency portion (occupying a band of frequencies above the filter cut-off frequency) from which chrominance signal components have been removed, and an uncombed (i.e., "flat") low frequency portion in which all luminance signal components have been preserved.

It is sometimes desirable to enhance or peak the vertical detail information of a displayed image by adding back to the luminance signal a greater amount of the vertical detail signal than is required to restore the luminance signal to its original form (i.e., a "flat" amplitude characteristic). The additional vertical detail signal then serves to emphasize vertical detail information so as to enhance picture detail resolution. For low level luminance signals, however, such enhancement tends to produce objectionable visible effects when noise interference is present and is undesirably enhanced along with the vertical detail information of the luminance signal.

Also in this instance, alternate line set-up variations (ALSUV) when present in the video signal are also undesirably enhanced. The ALSUV phenomenon is a form of low level signal interference manifested by variations in the black level of the video signal from line-to-line, and may be caused by misalignment of signal processing systems at the broadcast transmitter, for example. The ALSUV interference is particularly noticeable for low level video signals of about five percent of the maximum expected video signal amplitude, and produces objectionable visible effects on a reproduced image. There visible effects are undesirably magnified when vertical detail enhancement is provided.

In U.S. Pat. No. 4,245,237 (W. A. Lagoni), a vertical detail enhancement arrangement is described which provides a means for controlling the amount of signal enhancement under a variety of conditions so that in the region of small video signal amplitudes the enhancement signal is essentially cored whereas in a region of higher video signal amplitudes there is an amplification of the enhancement signal and in yet another region of higher amplitude video signals the enhancement signal is somewhat attenuated or pared. This arrangement, described in the aforementioned Lagoni patent, then has the desirable net result of avoiding the ALSUV problem by coring out low level interference, providing enhanced vertical detail in a mid-range of video signal amplitudes and trimming back on the vertical detail enhancement signal when the video signal is high in amplitude and it is not necessary to enhance the vertical detail.

Despite the good results achieved by the above-described system, under certain conditions a problem can arise which is not addressed by that system. Certain broadcast transmitters have been known to transmit the ALSUV type interference signals at amplitude levels which are beyond the coring levels set in the Lagoni system. This is undesirable because such components may fall in the second region where they will be enhanced. It would not be a desirable solution to merely set up higher fixed coring levels since at least some percentage of the very signals which it is desired to enhance would be lost.

Another aspect of this general situation is that some consumers simply do not want to have enhancement of vertical detail signals. Thus, it was recognized that under certain conditions such as, for example, the two mentioned above, it would be desirable to provide the color TV receiver user with a switch to disable the vertical detail enhancement. Now, if interference from the ALSUV became visible, in the displayed image, or, if it was desired not to enhance the vertical detail, then the user of the receiver could simply operate a disable switch.

But, switches often produce transients. Since the switch under consideration is involved in the video processing, such transients could cause disturbances in the video display. In fact it was observed that a simple switching circuit did produce transients which caused flashes in the output display. Thus, it became evident a need existed for a bounceless switch, i.e., one that would minimize the generation of transient signals during switching operations, to disable the vertical detail enhancement signal channel. The present invention provides a solution to this switching problem.

In accordance with the present invention a transistor circuit is provided where an input signal is applied to a first electrode, the second electrode is connected to a point of reference potential and an output signal is taken from the third electrode. A feedback path is connected between the first and third electrodes and includes a charge storage device and a variable impedance device. The variable impedance device is normally biased to exhibit a first feedback impedance value. A switch serially connected with the variable impedance device and supply potential selectively applies a second bias condition on the variable impedance device causing it to exhibit a second impedance value. In the second switching condition, the output signal is substantially reduced and the junction between the storage device and the impedance device remains at substantially the same D.C. value during transitions between the first to the second bias condition.

Figure 2:
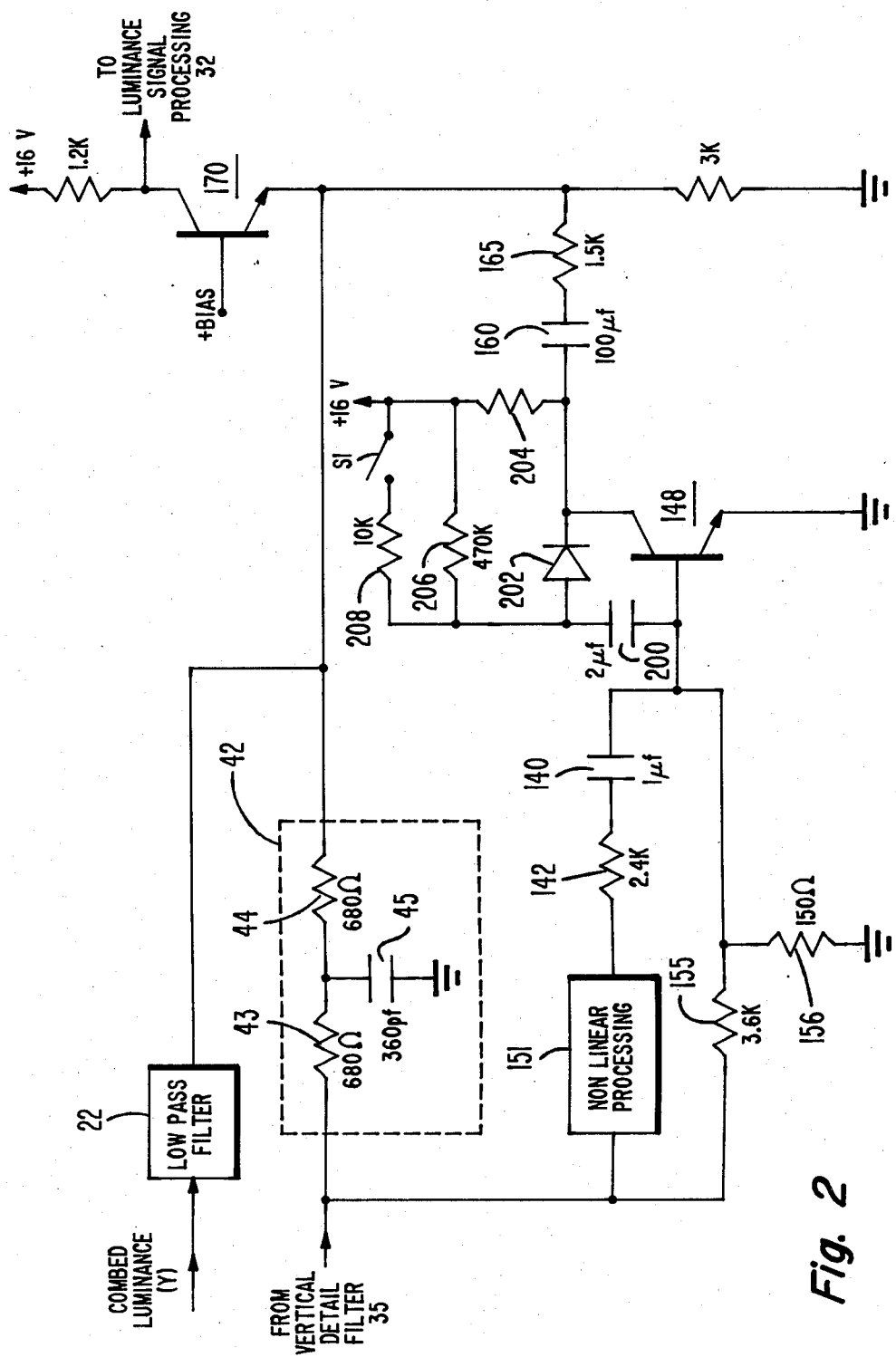

In the drawing:

FIG. 1 is a partial block diagram of a color television receiver employing a gain controllable non-linear signal processor and represents an especially useful application for the present invention; and FIG. 2 shows the details of the switching circuit according to the present invention in the vertical detail enhancement channel of the television receiver depicted in FIG. 1.

In FIG. 1, a source of composite color video signals 10 including luminance and chrominance components supplies video signals to an input of a comb filter 15 of known configuration, such as a comb filter employing charge coupled devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz which is amplitude and phase modulated with color information. The amplitude versus frequency response of comb filter 15 with respect to luminance combing action exhibits a peak amplitude response at integral multiples of the horizontal line scanning frequency (approximately 15,734 Hz), extending from D.C. or zero frequency, and an amplitude null at odd multiples of one-half the line scanning frequency, including the 3.58 MHz chrominance subcarrier frequency. The amplitude versus frequency response of comb filter 15 with respect to chrominance combing action exhibits a peak amplitude response at odd multiples of one-half the line frequency, including 3.58 MHz, and an amplitude null at integral multiples of the line frequency.

A "combed" luminance signal (Y) from the luminance output of comb filter 15 is coupled via a low pass filter 22 to a first input of a signal combining network 30. Filter 22 is arranged to pass all luminance signals below a cut-off frequency of approximately 4 MHz, and serves to remove noise and clock frequency components of switching signals associated with the switching operation of comb filter 15 when of a CCD type comb filter.

A "combed" chrominance signal (C) from the chrominance output of comb filter 15 is applied to a chrominance signal processing unit 64 for generating R-Y, B-Y and G-Y color difference signals, and to an input of a low pass vertical detail filter 35. Unit 64 includes a suitable filter for passing only those signal frequencies from comb filter 15 which occupy the band of chrominance signal frequencies. Filter 35 exhibits a cut-off frequency of approximately 1.8 MHz, and selectively passes those signal frequencies present in the combed chrominance signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration as well as controlled vertical detail enhancement and paring is accomplished as follows and as described in U.S. Pat. No. 4,245,237.

Vertical detail signals from the output of filter 35 exhibit a linear transfer function and are translated via a signal path including a low pass filter 42, to a second input of a combining network 30. Low pass filter 42 exhibits a cut-off frequency of approximately 2 MHz. Vertical detail signals from filter 35 also are supplied to a non-linear vertical detail signal processing circuit 50 which imparts different amounts of signal gain to vertical detail signals within three predetermined ranges of signal amplitude. Processed signals from network 50 are supplied to a third input of combiner 30, where they are summed with the signals coupled via filter 42 and with the combined luminance signal.

The output signal from combiner 30 corresponds to a reconstituted luminance component of the video signal with the vertical detail information thereof restored, and controllably enhanced and pared. The reconstituted luminance component is afterwards coupled to a luminance signal processing unit 32. An amplified luminance signal Y from unit 32 and the color difference signals from chrominance unit 64 are combined in a matrix 68 for providing, R, B, and G color image representation output signals. These signals are then suitably coupled to image intensity control electrodes of a color kinescope 70.

FIG. 2 shows further details of the system of FIG. 1. The linear vertical details signals from the output of vertical detail filter 35 are coupled to a signal summing point at the emitter electrode of common base transistor 170 via low pass filter 42. Filter 42 comprises resistors 43 and 44 and capacitor 45 arranged as shown.

The signals from the vertical detail filter 35 are also processed with a non-linear amplitude transfer (gain) function by a non-linear processor circuit 151. (See U.S. Pat. No. 4,245,238 for details of the function and operation of circuit 151). Circuit 151 manifests a non-linear composite amplitude transfer function for imparting different amounts of gain to signals having amplitudes within three ranges, low, medium and, high for both positive and negative signal polarities.

The non-linearly processed signals from circuit 151 are coupled to the base electrode of transistor 148 via capacitor 140 and resistor 142 where these signals are combined with vertical detail signals coupled from the output of vertical detail filter 35 via resistor 155. The signals coupled via resistor 155 are translated with a linear transfer function.

The signals coupled to the base electrode of transistor 148 are amplified and coupled from the collector electrode of transistor 148 to the summing point at the emitter electrode of common base transistor 170 via capacitor 160 and resistor 165. In addition, the combined luminance signal at the output of low pass filter 22 is coupled to the same summing point.

The output signal of the common base luminance amplifier is taken at the collector electrode of transistor 170 and provided to the luminance signal processor 32 for further processing as previously described. The signal provided to processor 32 contains vertial detail restoration as well as the particularly processed vertical detail enhancement.

In FIG. 2, the output signals from the collector of transistor 148 are AC coupled to the emitter electrode of transistor 170. In actual practice, the capacitor 160 was added as a practical matter from a component tolerance point of view. With a different selection of particular components it is possible to eliminate the A.C. coupling and use a simple D.C. connection in this particular section of the overall circuit. In any event, i.e., A.C. or D.C. coupling, the desirable results of using the present invention remain the same.

The general purpose of the use of the present invention is to avoid the deleterious effects of switching transients. In the context of the described embodiment, the concern is that the switching on and off of a component such as transistor 148, in order to have or not have vertical detail enhancement signals, could cause transients which are fast enough to be coupled through the system, despite the utilization coupling capacitors, and these fast transients are then processed in the receiver and cause flashes across the TV display.

As shown in FIG. 2, the circuitry connected between the base and collector electrodes of transistor 148 includes a user actuated switch S1 which can be operated to turn off and turn on the vertical detail enhancement or peaking. Capacitor 200 is connected between the base electrode of transistor 148 and the anode of diode 202. The cathode electrode of diode 202 is connected to the collector electrode of transistor 148. A load resistor 204 is connected between the collector of transistor 148 and the supply potential. Resistor 206 is connected between the supply potential and the junction of diode 202 and capacitor 200. The serial combination of switch S1 and resistor 208 is connected in parallel with resistor 206. The problem addressed by the above-mentioned, circuitry is, essentially, the way in which signal from transistor 148 can be turned on and off while maintaining the potential at the collector electrode substantially constant so that level shifts are not processed by the circuitry which is connected to the collector electrode.

The operation of the bounceless switch is as follows. Assume that switch S1 is open (non-conducting) and resistor 206 is selected to have a value which permits diode 202 to be forward biased but that resistance value is large enough so that the current through resistor 206 and diode 202 is very small. Under these conditions the junction of resistor 206, diode 202 and capacitor 200 is maintained at a value of the D.C. potential of the collector electrode plus about 0.7 volts and because of the very small current through diode 200, the dynamic impedance exhibited by the diode will be relatively high. As a result, the serial connection of capacitor 200 and diode 202 will apply relatively little degenerative feedback around the common emitter transistor amplifier 148. Under these conditions, transistor 148 provides the desired vertical detail enhancement signal at the collector electrode for further processing as previously described.

Now, assume that the user decides to disable the vertical detail enhancement feature of the receiver. Switch S1 is now closed (i.e., conducts). Resistor 208 is placed in parallel with resistor 206 and since resistor 208 has a value (e.g., 10K) which is much smaller than the value of resistor 206 (e.g., 470K), the parallel combination has a value of less than the smaller of the two and more current is delivered to the junction of diode 206 and capacitor 200. This drives diode 202 further into conduction and effectively changes the operating point of the diode which has the effect of lowering the dynamic impedance represented by diode 202. This creates greater negative feedback between the collector and base connection of transistor 148 and reduces the vertical detail enhancement signal at the collector of transistor 148 to nearly zero volts. Another way of viewing this operation is that the feedback resistance has been reduced by the operation of switch S1 and therefore the gain of the amplifier has been correspondingly reduced.

Since capacitor 200 was fully charged, or precharged, before switch S1 was closed, the junction of diode 202 and capacitor 200 is held at a fairly steady value for a period of time after switch S1 is closed. In this way, the junction point is kept free from sudden D.C. level changes, and, since the collector of transistor 148 is at the junction voltage less about 0.7 volts, the collector electrode is, at least at the time surrounding the throwing of the switch, kept free from sudden D.C. level changes.

In this way the arrangement of the present invention provides a bounceless switch which prevents sudden D.C. level shifts which might cause flashes in the displayed picture.

What is claimed is:

1. A circuit comprising:
   a transistor having first, second and third electrodes;
   first means for applying an input signal to said first electrode;
   second means for connecting said second electrode to a point of reference potential;
   third means connected to said third electrode for developing an output signal;
   a feedback path connected between said first and third electrodes and including a charge storage device connected in series with a variable impedance device;
   a source of supply potential;
   a switch operated variable impedance means connected between said source of supply potential and the junction between said storage device and said variable impedance device, said variable impedance means providing a first impedance for a first switching condition and a second impedance for a second switch condition; and
   said first switching condition causing said variable impedance device to assume a first impedance value and said second switching condition causing said variable impedance device to assume a second impedance value;
   whereby said output signal is substantially reduced during said second switching condition and said junction remains at substantially the same D.C. value during transitions from said first to said second switching condition.

2. The circuit according to claim 1 wherein said charge storage device comprises a capacitor.

3. The circuit according to claim 2 wherein said variable impedance device comprises a diode.

4. The circuit according to claim 3 wherein said switch operated variable impedance means comprises a switch connected in series with a fist resistor and a second resistor connected in parallel with said switch and first resistor, the resistance value of said first resistor being substantially smaller than the resistance value of said second resistor.

5. In a color TV receiver apparatus having a signal path for providing a vertial detail enhancement signal, a user activated circuit for substantially reducing the amplitude of said vertical detail enhancement signal, said circuit comprising:
- a transistor having first, second and third electrodes;
- means for applying said enhancement signal to said first electrode;
- means for connecting said second electrode to a point of reference potential;
- means connected to said third electrode for developing an amplified version of said enhancement signal;
- a feedback path including a charge storage device connected in series with a variable impedance device between said first and third electrodes;
- a source of supply potential;
- a switch operated variable impedance means connected between said source of supply potential and the junction between said charge storage device and said variable impedance device, said variable impedance means providing a first impedance for a first switching condition and a second impedance for a second switching condition; and
- said first switching condition causing said variable impedance device to assume a first impedance value and said second switching condition causing said variable impedance device to assume a second impedance value;
- said amplified version of said enhancement signal being substantially reduced during said second switching condition and said junction remaining at substantially the same D.C. value during transitions from said first to said second switching condition.

6. The circuit according to claim 5 wherein said charge storage device comprises a capacitor.

7. The circuit according to claim 6 wherein said variable impedance device comprises a diode.

8. The circuit according to claim 7 wherein said switch operated variable impedance means comprises a switch connected in series with a first resistor and a second resistor connected in parallel with said switch and first resistor, the resistance value of said first resistor being substantially smaller than the resistance value of said second resistor.

9. In a color TV receiver apparatus having a signal path for providing a vertical detail enhancement signal, a user activated circuit for substantially reducing the amplitude of said vertical detail enhancement signal, said circuit comprising:
- a transistor having base, emitter, and collector electrodes;
- means for supplying said enhancement signal to said base electrode;
- means for connecting said emitter electrode to a point of reference potential;
- means providing a vertical detail enhancement signal utilization circuit connected to said collector electrode;
- said transistor being biased to provide an amplified version of said enhancement signal at the collector electrode;
- a feedback path including a capacitor and a diode connected in series in the order named between the base and collector electrodes with the cathode of said diode connected to said collector electrode;
- a source of supply potential coupled to said collector electrode via a first resistor;
- the series combination of a normally open switch and a second resistor connected between said source and the junction between said capacitor and said diode;
- a third resistor connected between said source and said junction;
- the value of said second resistor being substantially smaller than the value of said third resistor;
- said third resistor providing a charging path for said capacitor and having a value such that said diode is just forward biased when said switch is opened;
- said amplified version of said enhancement signal being substantially reduced when said switch is closed and said junction remaining at substantially the same D.C. level during transitions of said switch from said normally open to said closed position.

* * * * *